UNITED STATES PATENT OFFICE.

RENÉ BOHN, OF MANNHEIM, GERMANY, ASSIGNOR TO THE BADISCHE ANILIN AND SODA FABRIK, OF LUDWIGSHAFEN, GERMANY.

BLUE SULFUR DYE AND PROCESS OF MAKING SAME.

SPECIFICATION forming part of Letters Patent No. 667,486, dated February 5, 1901.

Application filed September 6, 1900. Serial No. 29,154. (No specimens.)

*To all whom it may concern:*

Be it known that I, RENÉ BOHN, doctor of philosophy and chemist, a citizen of the Swiss Republic, residing at Mannheim, in the Grand Duchy of Baden, Germany, have invented a new Blue Dye and Process of Making Same, of which the following is a specification.

This invention relates to the production of new blue coloring-matter from 1.5-dinitro-naphthalene. This new coloring-matter can be obtained by treatment of 1.5-dinitro-naphthalene in the presence of sulfuric acid with hydrogen sulfid. It may also be obtained by passing hydrogen sulfid into a naphthazarin melt prepared in the well-known manner, preferably if it be heated to about one hundred and thirty (130°) degrees centigrade.

In the following example I illustrate the nature of this my invention, but do not wish to be understood as limiting it to this. The parts are by weight.

Example: Mix one hundred (100) parts of 1.5-dinitro-naphthalene with two thousand (2,000) parts of sufuric acid of ninety-six (96) per cent. $H_2SO_4$ in an iron vessel. Heat this to one hundred and thirty (130°) degrees centigrade and pass into this a current of hydrogen sulfid while stirring. During the course of the reaction a test portion of the melt can be dissolved in water, giving a blue solution, and soon thereafter, as a test will show, the melt becomes insoluble in water. This point is usually reached in the course of from eight (8) to ten (10) hours. Cool the melt and pour into ten thousand (10,000) parts of water. Filter and wash.

My new coloring-matter in the dry state is a blue-black powder. In the form of a thirty (30) per cent. paste with water it possesses a blue color and is soluble in hot water, giving a green-blue solution, which solution when made alkaline with sodium carbonate or caustic soda does not change in color. In dilute caustic-soda solution it dissolves, giving a green-blue solution. With dilute carbonate-of-soda solution it gives a green-blue solution, a brown color with concentrated sulfuric acid, and a blue-violet with nitro-benzene. Heated with a solution of sodium bisulfite of thirty-eight (38°) degrees Baumé it gives a red-brown solution. With the well-known reducing mixture of tin salt (stannous chlorid) and hydrochloric acid it gives a brown-yellow solution, which on addition of ten (10) volumes of water yields a yellow precipitate.

My new coloring-matter dyes unmordanted wool a blue color, which after treatment with potassium bichromate changes to a green.

What is claimed is—

1. The process of making blue coloring-matter which consists in treating 1.5-dinitro-naphthalene with sulfuric acid and a sulfid, all substantially as described.

2. The process of making blue coloring-matter which consists in treating 1.5-dinitro-naphthalene with sulfuric acid and hydrogen sulfid, all substantially as described.

3. As a new product the blue coloring-matter which can be derived from 1.5-dinitro-naphthalene, sulfuric acid and hydrogen sulfid, which gives a green-blue solution in water which solution when made alkaline with caustic-soda solution is not changed in color; it gives a brown color with concentrated sulfuric acid, a blue-violet with nitro-benzene and dyes wool a blue color which when treated with potassium bichromate changes to green, all substantially as described.

In testimony whereof I have hereunto set my hand in the presence of two subscribing witnesses.

RENÉ BOHN.

Witnesses:
JACOB ADRIAN,
H. W. HARRIS.